ALDEN T. FOSTER.
Stand for Carving Knife and Fork.

72009

PATENTED DEC 10 1867

Witnesses
Geo. C. Humphries
F. C. Somes

Inventor
Alden T. Foster
by
D. E. Somes & Co.
his Attorneys

ALDEN T. FOSTER, OF ALBANY, NEW YORK.

*Letters Patent No. 72,009, dated December 10, 1867.*

IMPROVED CARVING-KNIFE AND FORK-HOLDER.

*The Schedule referred to in these Letters Patent and making part of the same.*

TO ALL WHOM IT MAY CONCERN:

Be it known that I, ALDEN T. FOSTER, of Albany, of the county of Albany, and in the State of New York, have invented a new and useful Carving-Knife and Fork-Holder; and I do hereby declare that the following is a full, clear, and exact description thereof, reference being had to the accompanying drawings, making a part of this specification.

My invention consists in constructing a dish or stand of earthen or any suitable material, to be used on dining-tables as a rest for the carving-knife and fork.

Figure 1:
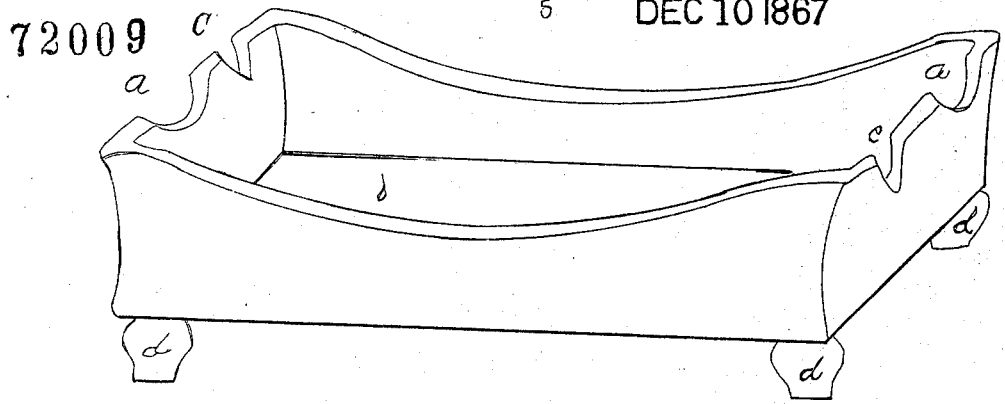
Figure 1 represents a perspective view of my invention.
Figure 2:
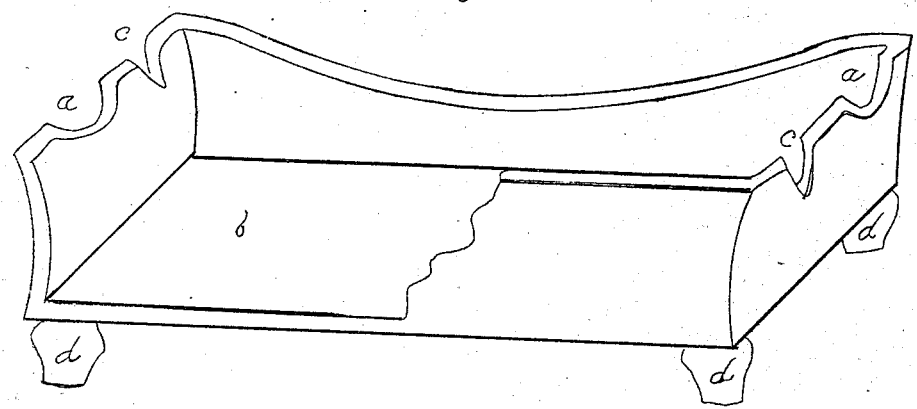
Figure 2 represents a perspective view, with a portion of one side represented as broken away.
Figure 3:
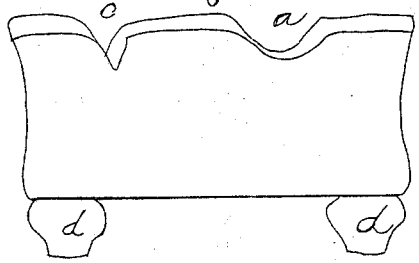
Figure 3 represents an end elevation.

A is a dish of a rectangular form, furnished with pedestals $d\ d$. In each end of this dish is a circular and an angular notch, the circular notches being opposite the angular ones. The circular notches $a\ a$ are designed as receptacles for the handles of the knife and fork. The angular notches $c\ c$ are so cut as to receive the blade of the knife and tines of the fork, so that when a knife and fork are placed on the stand, their handles will be opposite each other. The dish is made with a bottom, $b$, water-tight, so as to receive the drippings of the gravy from the knife and fork. It may be constructed with or without the legs $d$.

The conveniences and advantages of my invention, for the purposes herein specified, are too obvious to those accustomed to the use of the carving-knife and fork to require enumeration.

What I claim as new, and desire to secure by Letters Patent, is—

As an article of manufacture, the dish or stand A, constructed substantially as described, with notches $a\ a$ and $c\ c$, as and for the purpose set forth.

In testimony that I claim the above-described carving-knife and fork-holder, I have hereunto signed my name, this fifth day of October, 1867.

ALDEN T. FOSTER.

Witnesses:
ALBERT H. SCATTERGOOD,
HENRY G. RADCLIFFE.